Nov. 19, 1940.   F. L. TALBOT   2,222,094
FILM HOLDER
Filed March 18, 1939

Inventor
FRANK L. TALBOT
By Chas. C. Reyf.
Attorney

Patented Nov. 19, 1940

2,222,094

UNITED STATES PATENT OFFICE 2,222,094

FILM HOLDER

Frank L. Talbot, St. Paul, Minn.

Application March 18, 1939, Serial No. 262,759

3 Claims. (Cl. 88—24)

This invention relates to a film holder and particularly to a holder for holding a film while the same is disposed in a photo-enlarging machine.

It is desirable to have a simple and efficient film holder by means of which the negative to be enlarged may be easily handled and conveniently placed in and withdrawn from the enlarging machine. It is a common practice to make two exposures on one film. If such a film is placed in a holder with the film extending transversely of the holder, then each image on the film is at one side of the light-projecting lens so that the rays of light do not extend symmetrically to a line extending perpendicular to the film at the center thereof.

It is also desirable to have a holder which will so hold the film that the film may be readily engaged with the fingers of one hand in removing the film and holding it for manipulation relative to said holder.

It is customary to have a transparent plate placed on top of the film in such a holder and it is desirable that this plate may be manipulated as necessary without the fingers coming in contact with the surface thereof.

It is an object of this invention, therefore, to provide a very simple and efficient film holder for a photo-enlarging machine and one that can be easily and quickly operated.

It is a further object of the invention to provide a film holder for an enlarging machine in which a film with two images thereon may be disposed in the enlarging machine so that each image will be disposed symmetrical to the central axis of the light-projecting lens.

It is still another object of the invention to provide a film holder for a photo-enlarging machine having a glass plate receivable in a recess therein and adapted to be disposed over one end of the film, said holder being so constructed and arranged that the glass plate may be lifted at its edges by one hand of the operator while the film may be lifted at its edge by the other hand of the operator.

These and other objects and advantages of the invention will be fully set forth in the following description made in connection with the accompanying drawing in which like reference characters refer to similar parts throughout the several views and in which—

Figure 5:
Fig. 5 is a vertical section taken substantially on line 5—5 of Fig. 2 as indicated by the arrows.

Referring to the drawing, a film holder is shown comprising a frame 10. While this frame might take various forms in plan, it preferably is formed to suit the space or recess provided for it in the enlarging machine and in the embodiment of the invention illustrated, the same is shown as having parallel ends 10a and 10b and sides 10c and 10d which converge somewhat toward the end 10a. The corners of said frame are slightly rounded and said frame is provided at one end with a handle portion 10e having curved sides extending to the end 10b. Said frame 10 is of flat construction and of comparatively small thickness, the same having substantially parallel top and bottom surfaces. Frame 10 has a recess 10f formed on its bottom side, the same being illustrated as rectangular in form and in which is disposed a transparent pane 11. While said pane might be held in place in any convenient manner, in the embodiment of the invention illustrated it is shown as held in place by a plurality of small flat clips or buttons 12 each pivoted in a small substantially semi-circular recess 10g by small pivot screws 13. There are two of the buttons 12 at each side of the pane 11 and it will be evident that said buttons may be turned on their pivots 13 so as not to lie over pane 11 and thus to permit its removal. Frame 10 has a recess 10h at the side opposite recess 10f. Said recess 10h is also shown as substantially rectangular and the bottom of said recess is formed in part by the inner surface of pane 11. Said recess 10h has a portion 10i of less width than the portion opposite pane 11 and this portion 10i has a bottom surface 10j extending for some distance flush with the inner side of pane 11 and then inclining upwardly at a slight angle to the top surface of frame 10 as clearly shown in Fig. 5. A transparent plate 14 is provided adapted to fit in and be received in the recess 10h opposite pane 11 and said plate 14 is preferably of greater thickness than the depth of recess 10h.

Figure 1:
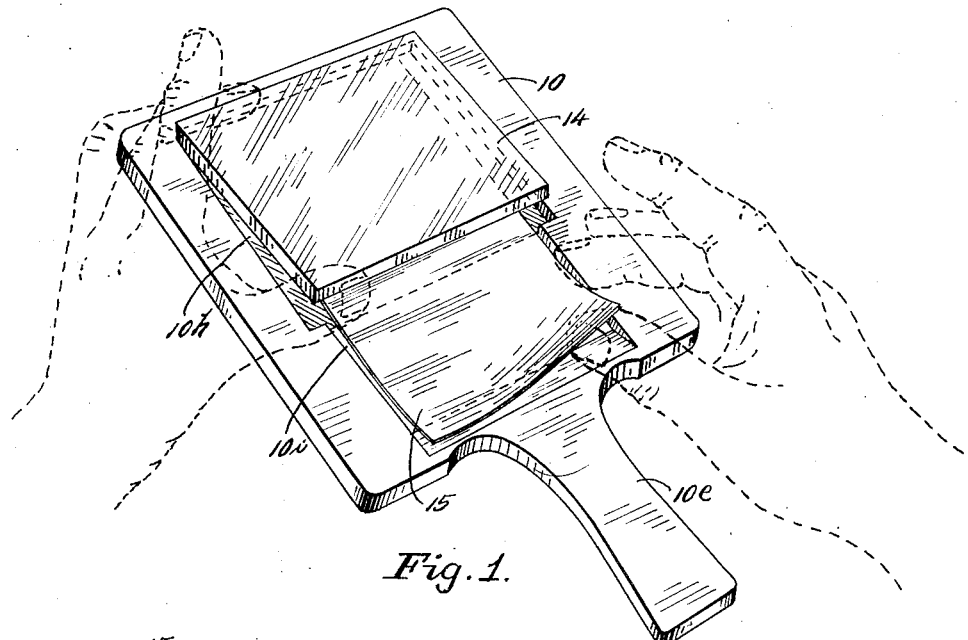
Fig. 1 is a perspective view of the device, the hands of the operator being shown in dotted lines.
Figure 4:
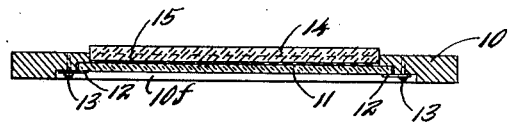
Fig. 4 is a vertical section taken substantially on line 4—4 of Fig. 2 as indicated by the arrows.
Figure 2:
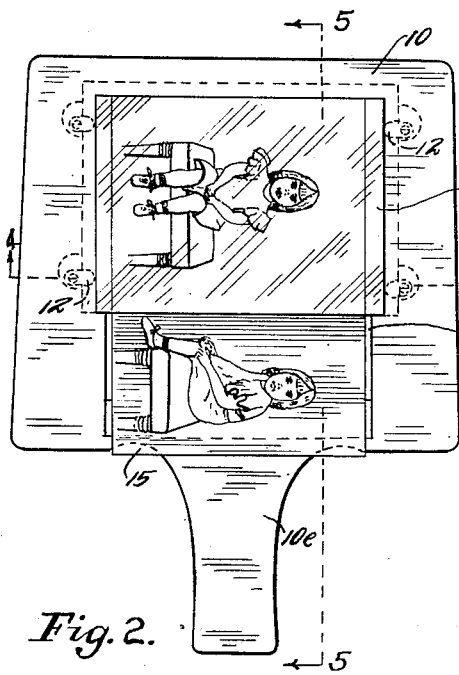
Fig. 2 is a top plan view of the device.
Figure 3:
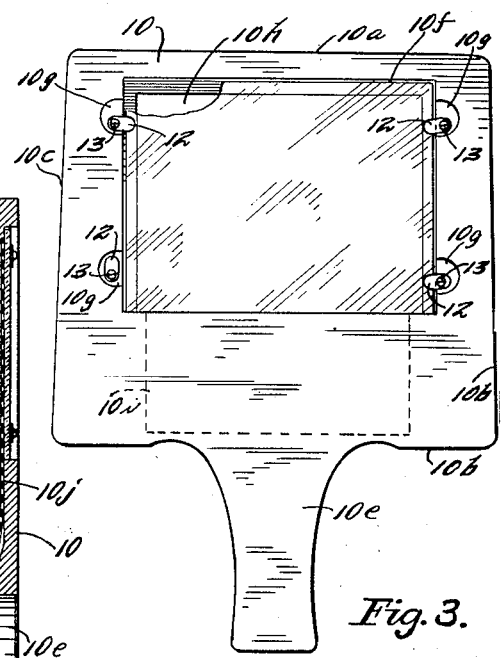
Fig. 3 is a bottom plan view of the device.

In operation, when a film with two images thereon, such as the film 15 shown in the drawing, is used, the film will be placed with one end disposed in recess 10h over the inner side of pane 11. Plate 14 will at this time be removed and after the film is placed in the recess 10h, plate 14 will be inserted in said recess on top of film 15. The end of the film will then be held between the pane 11 and plate 14. The holder will now be inserted into the enlarging machine in the opening provided therefor and the image at one end of the film will be disposed centrally relative to the axis of the light-projecting lens. This is desirable as the rays of light will then diverge in lines symmetrically disposed about the axis of said lens. In holders heretofore used where the film was placed entirely beneath the top plate and extended transversely of the frame, neither image would be centrally disposed relative to the projecting lens. It is objectionable to have the images disposed at one side of the projecting lens. After the exposure is made, the holder is withdrawn from the machine. The plate 14 is at the top side of the holder and the operator can now rest the holder on some support and can lift plate 14 by its opposite edges as illustrated in Fig. 1 without getting the front of his fingers on the surface of plate 14. The plate can thus be lifted without any finger marks being placed thereon. If it were necessary to turn the frame upside-down to let plate 14 drop into one hand of the operator, said plate would probably be marked with the operator's hand. As plate 14 is thus lifted, the operator can engage one end of the film 15 with the thumb and finger of his other hand and said film can thus be readily lifted, reversed and placed with its opposite end in the recess 10h. By having the inclined portion of bottom 10j the end of the film is disposed in convenient position for being engaged by the operator's thumb and finger. The film can thus be turned end for end and the plate 14 again dropped in place. The reversal of the film is thus very easily and quickly accomplished. The holder will again be placed in the machine and the other end of the film or negative exposed. It will be understood that the holder is not limited in use to films having two images thereon. Any film with one image thereon can be placed in the recess 10h up to the limit of the dimensions of said recess. A common size of films having two images thereon is a 5 x 7 film. When it is desired to remove pane 11 for cleaning or polishing, this can readily be done as above described by moving the buttons 12.

From the above description it will be seen that I have provided a very simple and efficient construction of film holder and one which greatly facilitates the handling of the film or negative. The necessary operations can be much more quickly performed than with holders previously used. Furthermore, a proper positioning of the negative relative to the projecting lens is also obtained. The film holder constitutes a great advance in the art. The same has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A film holder for a photo-enlarging machine comprising a flat frame with a handle at one end, a transparent pane at one side of said frame and secured therein, said frame having a recess at its opposite side extending to a line adjacent said handle, the bottom of which is continued substantially flush with the inner surface of said pane and then inclines upwardly to the surface of said frame at the end adjacent said handle and a transparent plate of much less length than said recess receivable in the end of said recess opposite said handle, said plate being of appreciably greater thickness than the depth of said recess and adapted to hold one end of a film against said pane so that a double film will project beyond said plate and above said inclined portion and may be grasped by the thumb and finger of one hand while said plate may be lifted at its edges by the thumb and finger of the other hand.

2. A film holder for a photo-enlarging machine having in combination, a flat frame with a handle at one end, said frame having a recess at one side, a transparent pane set into said recess, said frame having a recess at its opposite side extending longitudinally thereof, the bottom of said latter recess being formed by the inner side of said pane, which bottom extends toward one end of said frame flush with said inner side and then inclines upwardly to the surface of said frame and a transparent plate fitting in and receivable in one end of said latter recess and of greater thickness than the depth of said recess whereby said film will extend over said inclined portion of said bottom and may be lifted by its edge and said plate may be lifted at its edges by the thumb and finger of one hand.

3. A film holder for a photo-enlarging machine comprising a flat frame of general rectangular form and having a handle at one end, a transparent pane set into said frame adjacent the end thereof opposite said handle, said frame having a recess in its opposite side, the bottom of which is formed by the inner side of said pane, said recess having a narrower portion extending toward the handle end of said frame, the bottom of which is flush with said inner side but inclines upwardly to the surface of said frame adjacent said handle end and a transparent plate fitting in and receivable in said recess and of greater thickness than said recess whereby a film may be disposed over said pane and under said plate and have its end projecting in said recess over said inclined portion of said bottom so that it can be lifted at one end with one hand and said plate may be lifted at its edges with the other hand.

FRANK L. TALBOT.